(12) United States Patent
Xin et al.

(10) Patent No.: US 10,932,439 B2
(45) Date of Patent: Mar. 2, 2021

(54) END TABLE FOR CRATING A PET

(71) Applicant: MERRY PRODUCTS CORPORATION, Richmond Hill (CA)

(72) Inventors: Kevin Xin, Markham (CA); Jeffrey Pinard, Toronto (CA)

(73) Assignee: MERRY PRODUCTS CORPORATION, Richmond Hills (CA)

(*) Notice: Subject to any disclaimer, the term of this patent is extended or adjusted under 35 U.S.C. 154(b) by 31 days.

(21) Appl. No.: 16/223,407

(22) Filed: Dec. 18, 2018

(65) Prior Publication Data

US 2019/0191664 A1 Jun. 27, 2019

Related U.S. Application Data

(60) Provisional application No. 62/610,587, filed on Dec. 27, 2017.

(51) Int. Cl.
*A01K 1/03* (2006.01)
*A47B 13/04* (2006.01)
*A47B 37/00* (2006.01)
*A47B 47/04* (2006.01)

(52) U.S. Cl.
CPC .............. *A01K 1/03* (2013.01); *A01K 1/033* (2013.01); *A47B 13/04* (2013.01); *A47B 37/00* (2013.01); *A47B 47/042* (2013.01)

(58) Field of Classification Search
CPC ........... A01K 1/03; A01K 1/033; A47B 37/00
USPC .......................................................... 312/322
See application file for complete search history.

(56) References Cited

U.S. PATENT DOCUMENTS

| | | | | |
|---|---|---|---|---|
| 2,669,499 A | * | 2/1954 | Vanderplank | E06B 3/5045 312/322 |
| 3,456,995 A | * | 7/1969 | Nyquist | E05D 15/58 312/322 |
| 4,945,972 A | * | 8/1990 | Takeuchi | E05D 15/264 160/203 |
| 5,108,165 A | * | 4/1992 | Rorke | A47B 96/00 312/322 |
| 7,478,892 B2 | * | 1/2009 | Punzel | E05C 9/043 312/322 |
| 8,127,714 B2 | * | 3/2012 | Sundborger | A01J 5/007 119/14.02 |
| 8,303,056 B2 | * | 11/2012 | Giorgi | E05F 1/16 312/322 |

(Continued)

*Primary Examiner* — Daniel J Rohrhoff
(74) *Attorney, Agent, or Firm* — Stephen T. Olson; Harness, Dickey & Pierce, P.L.C.

(57) ABSTRACT

An end table for crating a pet includes a first side panel and a second side panel. The second side panel is laterally spaced from and parallel to the first side panel. The end table additionally includes a bottom panel, a top panel and a rear panel. The rear panel laterally extends between rear ends of the first and second side panels. The end table further includes a door carried by the first side panel for sliding movement between a stowed position and an open position and for rotational movement between the open position and a closed position in which the door closes an opening laterally between front ends of the first and second side panels. The first side panel, the second side panel, the rear panel, the bottom panel, the top panel and the door cooperate to define an enclosed area for the pet.

11 Claims, 15 Drawing Sheets

(56) References Cited

U.S. PATENT DOCUMENTS

| | | | |
|---|---|---|---|
| 8,985,058 B2* | 3/2015 | Cantwell | A01K 1/0245 |
| | | | 119/474 |
| 9,894,996 B1* | 2/2018 | Grela | E06B 3/5045 |
| 9,901,069 B2* | 2/2018 | Jones | A01K 1/034 |
| 2002/0152969 A1* | 10/2002 | Grigsby | A01K 1/033 |
| | | | 119/500 |
| 2004/0100171 A1* | 5/2004 | Brown | E05D 15/58 |
| | | | 312/322 |
| 2004/0239216 A1* | 12/2004 | Castillo | E05D 15/58 |
| | | | 312/322 |
| 2007/0089683 A1* | 4/2007 | Roberts | A01K 31/06 |
| | | | 119/477 |
| 2007/0159037 A1* | 7/2007 | Hoffman | E05D 15/58 |
| | | | 312/322 |
| 2009/0031964 A1* | 2/2009 | Proxmire | A47B 17/065 |
| | | | 119/484 |
| 2010/0200580 A1* | 8/2010 | Cheng-Lung | A01K 1/0236 |
| | | | 220/4.01 |
| 2015/0008811 A1* | 1/2015 | Ishii | E05D 15/58 |
| | | | 312/322 |
| 2019/0021272 A1* | 1/2019 | Marshall, III | F24F 13/085 |

\* cited by examiner

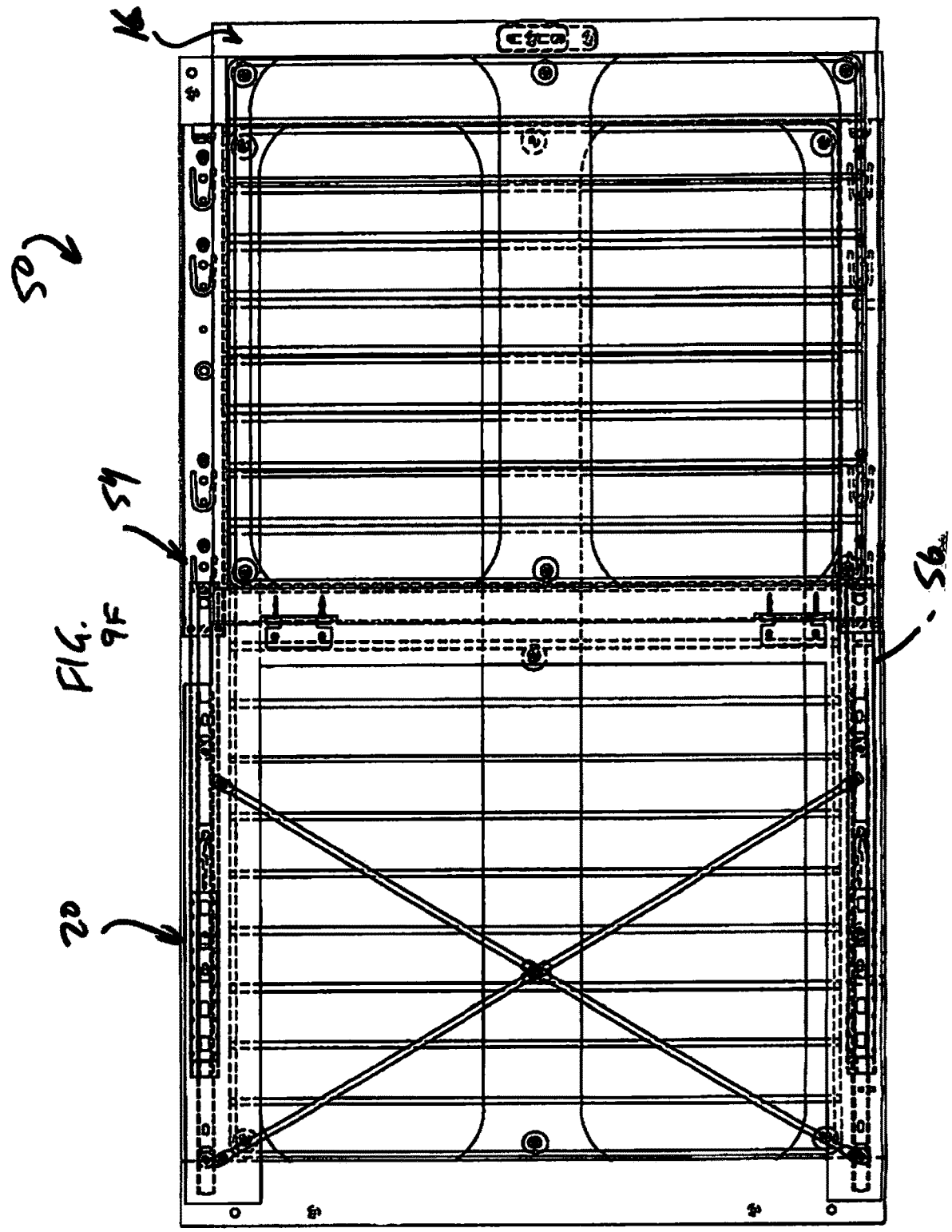

END TABLE FOR CRATING A PET

CROSS-REFERENCE TO RELATED APPLICATION

This application claims the benefit of U.S. Provisional Patent Application No. 62/610,587 filed 27 Dec. 2017, which application is herein expressly incorporated by reference.

FIELD OF THE INVENTION

The present teachings generally relate to pet crates. The present teachings more particularly relate to a pet crate that also function as an end table and includes a sliding door.

BACKGROUND

The statements in this section merely provide background information related to the present disclosure and may not constitute prior art.

Pet crates provide a secure location to keep a pet such as a dog. Pet crates also provide an area to which a pet can retreat. Various pet crates have been previously proposed and have generally proven to be suitable for their intended purposes. Known pet crates, however, take up space within a home and are generally not aesthetically pleasing. Accordingly, a continuous need for improvement in the relevant art remains.

SUMMARY

According to one particular embodiment, the present teachings provide an end table for crating a pet. The end table includes a first side panel and a second side panel. The second side panel is laterally spaced from and parallel to the first side panel. The end table additionally includes a bottom panel, a top panel and a rear panel. The rear panel laterally extends between rear ends of the first and second side panels. The end table further includes a door carried by the first side panel for sliding movement between a stowed position and an open position and for rotational movement between the open position and a closed position in which the door closes an opening laterally disposed between front ends of the first and second side panels. The first side panel, the second side panel, the rear panel, the bottom panel, the top panel and the door cooperate to define an enclosed area for the pet.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings.

Figure 9A:
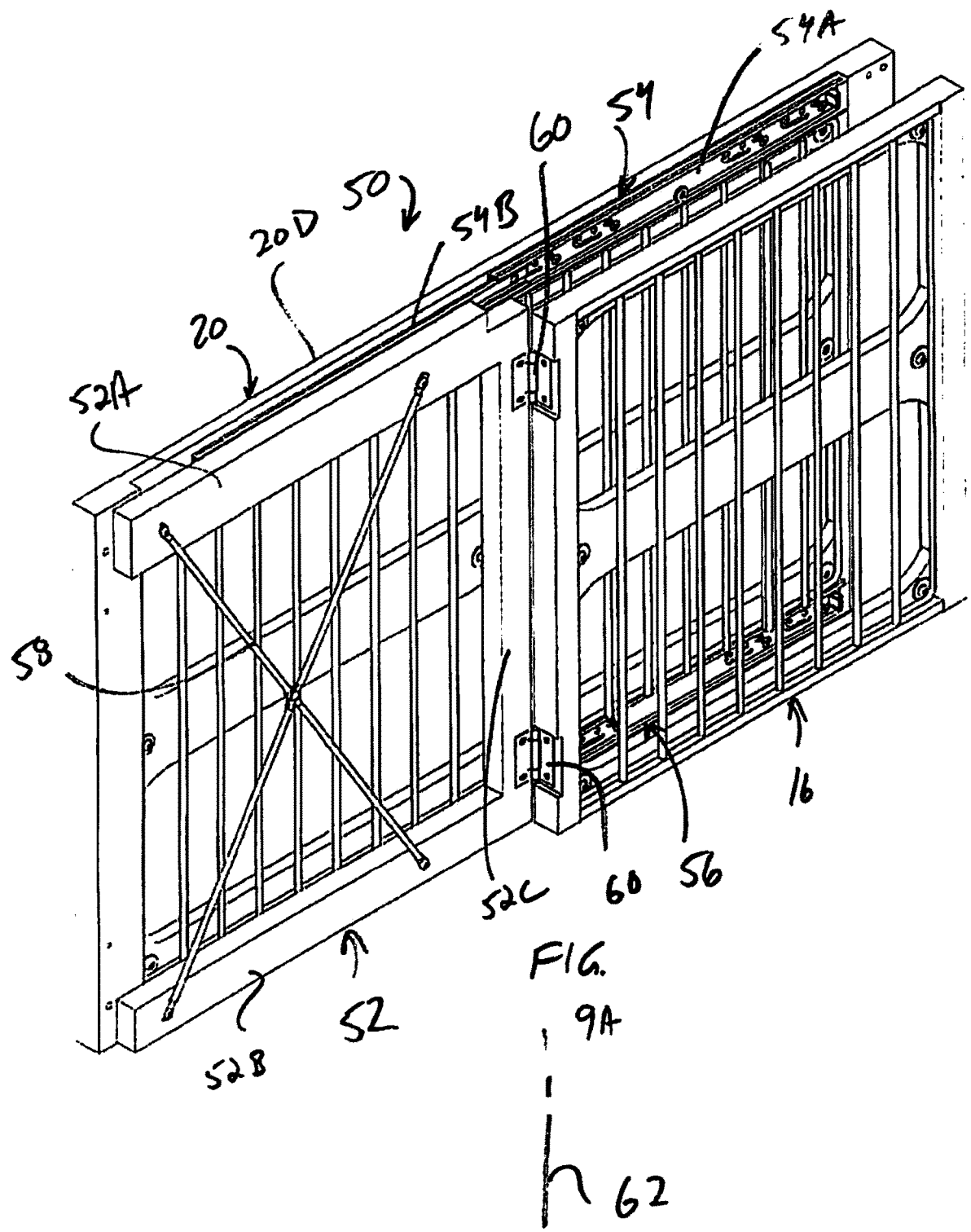
FIG. 9A is a perspective view of an inner side of another side panel and door subassembly of the end table for crating a pet in accordance with the present teachings, the door shown in a stowed position relative to the side panel.
Figure 9B:
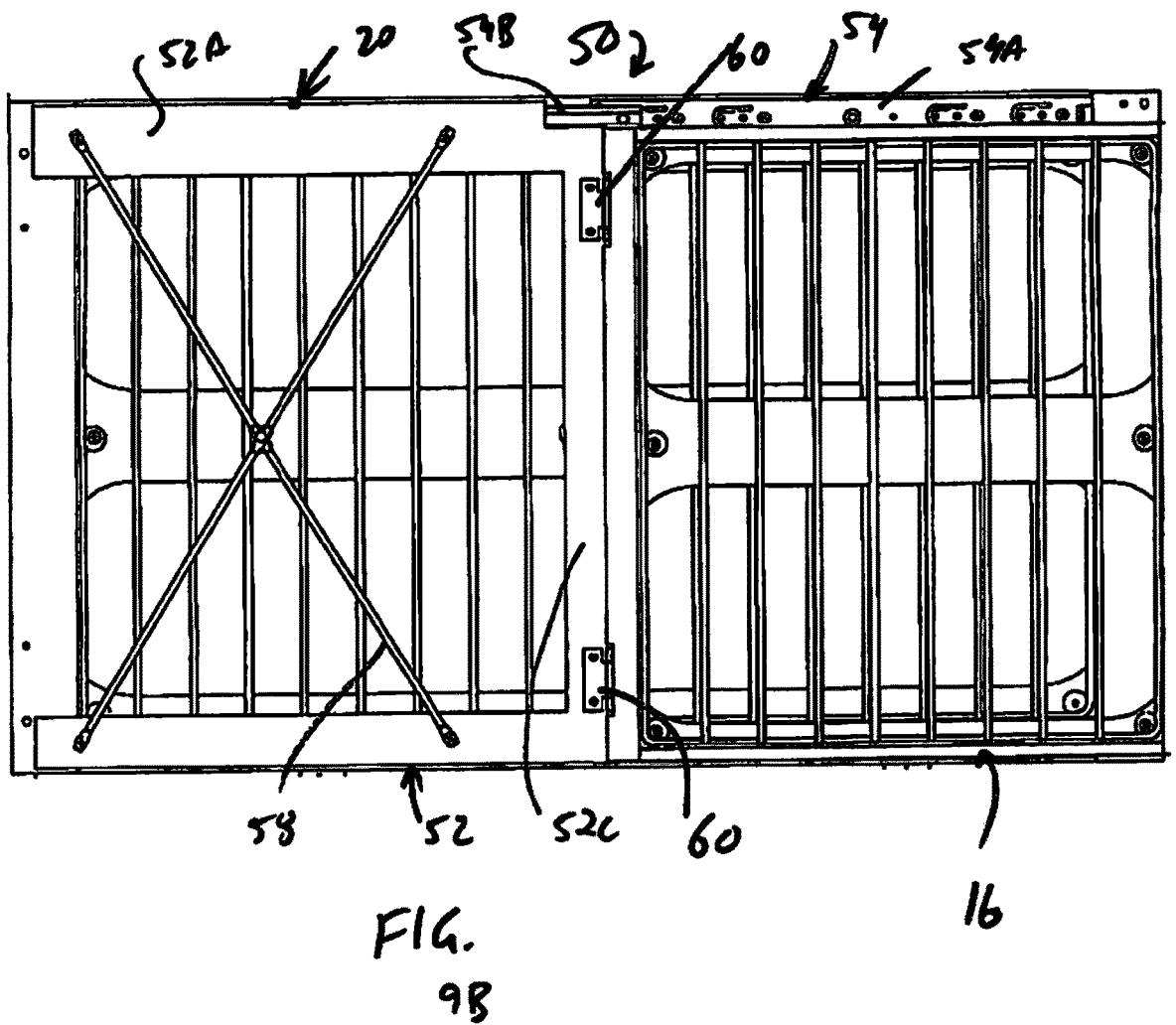

FIG. 9B a side view showing the inner side of the side panel and door subassembly of FIG. 9A, the door shown in the stowed position.

Figure 9C:
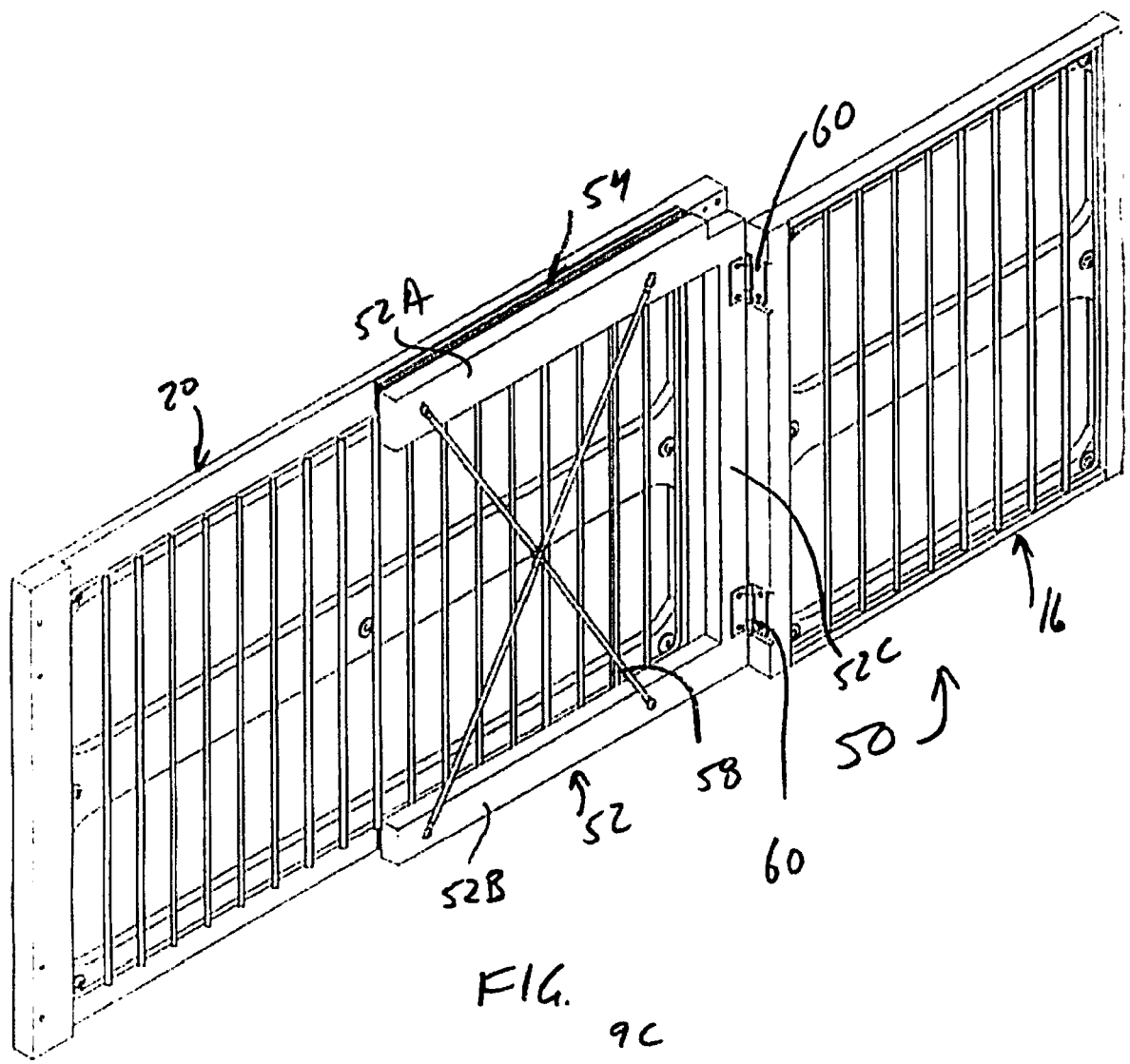

FIG. 9C is perspective view showing the inner side of the side panel and door subassembly of FIG. 9A, the door in the open position.

Figure 9D:
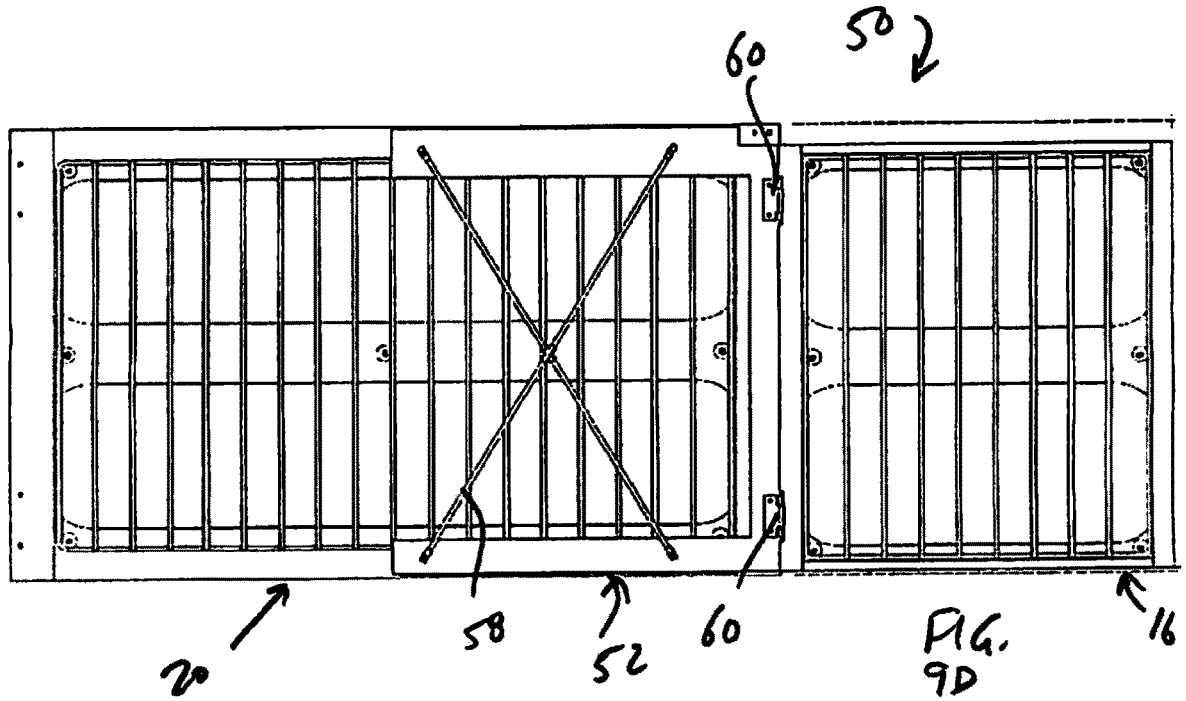

FIG. 9D a side view showing the inner side of the side panel and door subassembly of FIG. 9A, the door again shown in the open position.

Figure 9E:
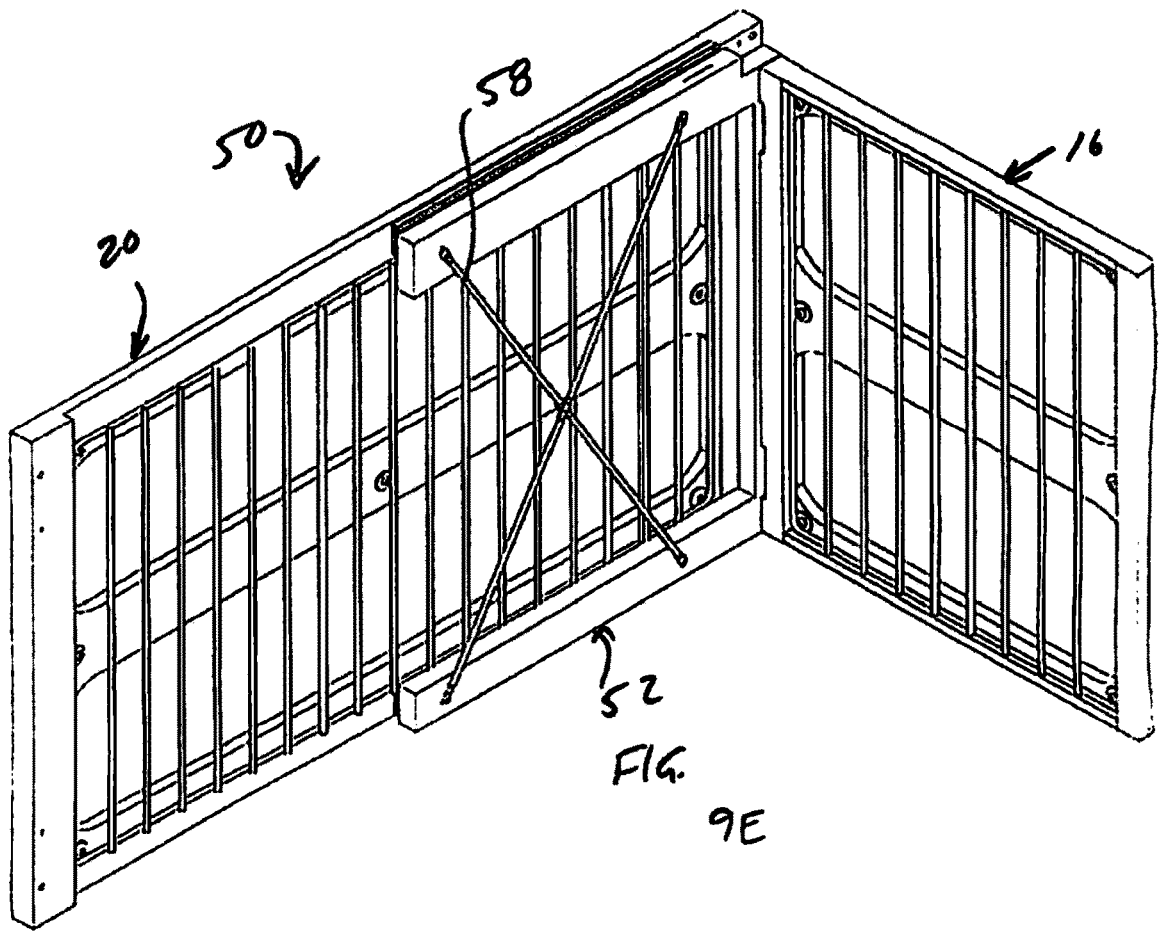

FIG. 9E is perspective view showing the inner side of the side panel and door subassembly of FIG. 9A, the door shown in the closed position.

FIG. 9F a side view showing the inner side of the side panel and door subassembly of FIG. 9A, the door shown in the closed position.

DETAILED DESCRIPTION OF VARIOUS ASPECTS

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure.

With reference to FIGS. 1A-1E and 2-8 of the drawings, an end table for crating a pet in accordance with the present teachings is illustrated and generally identified at reference character 10. The end table 10 is particular intended for crating a dog. It will be understood, however, that the end table 10 may also crate a cat or other animal. For certain applications, the end table 10 may conceal a litter box (not shown).

The end table for crating a pet 10 of the present teachings is illustrated to generally include a top panel 12, a bottom panel 14, a door 16 and a plurality of side panels that cooperate to define an enclosed area 18. The plurality of side panels includes a first side panel 20, a second side panel 22 and a rear panel 24. The first side panel 20 and the door 16 may cooperate to define a subassembly or side panel and door subassembly 26 of the end table 10. As will be appreciated more fully below, the end table for crating a pet 10 may be provided to the consumer in these various pieces for assembly.

The first side panel 20 includes a frame constructed of wood or other suitable material. The frame of the first side panel 20 is illustrated to include first and second vertically extending members 20A and 20B and first and second horizontally extending members 20C and 20D. The frame may further include a third horizontally extending member 20E extending between the first and second vertically extending members 20A and 20B and disposed between the first and second horizontally extending members 20C and 20D. The first side panel 20 further includes a wire frame 27 including a plurality vertically extending bars.

As shown, the first side panel 20 may further include first and second tracks 28 and 30. The first track 28 is attached to an inner side of the first side panel 20 adjacent a lower edge of the first side panel 20. The second track 30 is attached to an inner side of the first side panel 20 adjacent an upper edge of the first side panel 20. As will be understood more fully below, the first and second tracks 28 and 30 define channels that slidably receive the door 16.

The door 16 similarly includes a frame constructed of wood or other suitable material. The frame of the door 16 is illustrated to include first and second vertically extending members 16A and 16B and first and second horizontally extending members 16C and 16D. The frame may further include a third horizontally extending member 16E extending between the first and second vertically extending members 16A and 16B and disposed between the first and second horizontally extending members 16C and 16D. The door 16 further includes a wire frame 32 including a plurality vertically extending bars.

The second side panel 22 similarly includes a frame constructed of wood or other suitable material. The frame of the second side pane 22 is illustrated to include first and second vertically extending members 22A and 22B and first and second horizontally extending members 22C and 22D. The frame may further include a third horizontally extending member 22E extending between the first and second vertically extending members 22A and 22B and disposed between the first and second horizontally extending members 22C and 22D. The second side panel 22 further includes a wire frame 34 including a plurality vertically extending bars. The second side panel 22 is laterally spaced from and parallel to the first side panel 20.

The rear panel 24 similarly includes a frame constructed of wood or other suitable material. The frame of the rear panel 24 is illustrated to include first and second vertically extending members 24A and 24B and first and second horizontally extending members 24C and 24D. The frame may further include a third horizontally extending member 24E extending between the first and second vertically extending members 24A and 24B and disposed between the first and second horizontally extending members 24C and 24D. The rear panel 24 further includes a wire frame 36 including a plurality vertically extending bars.

Figure 1A:
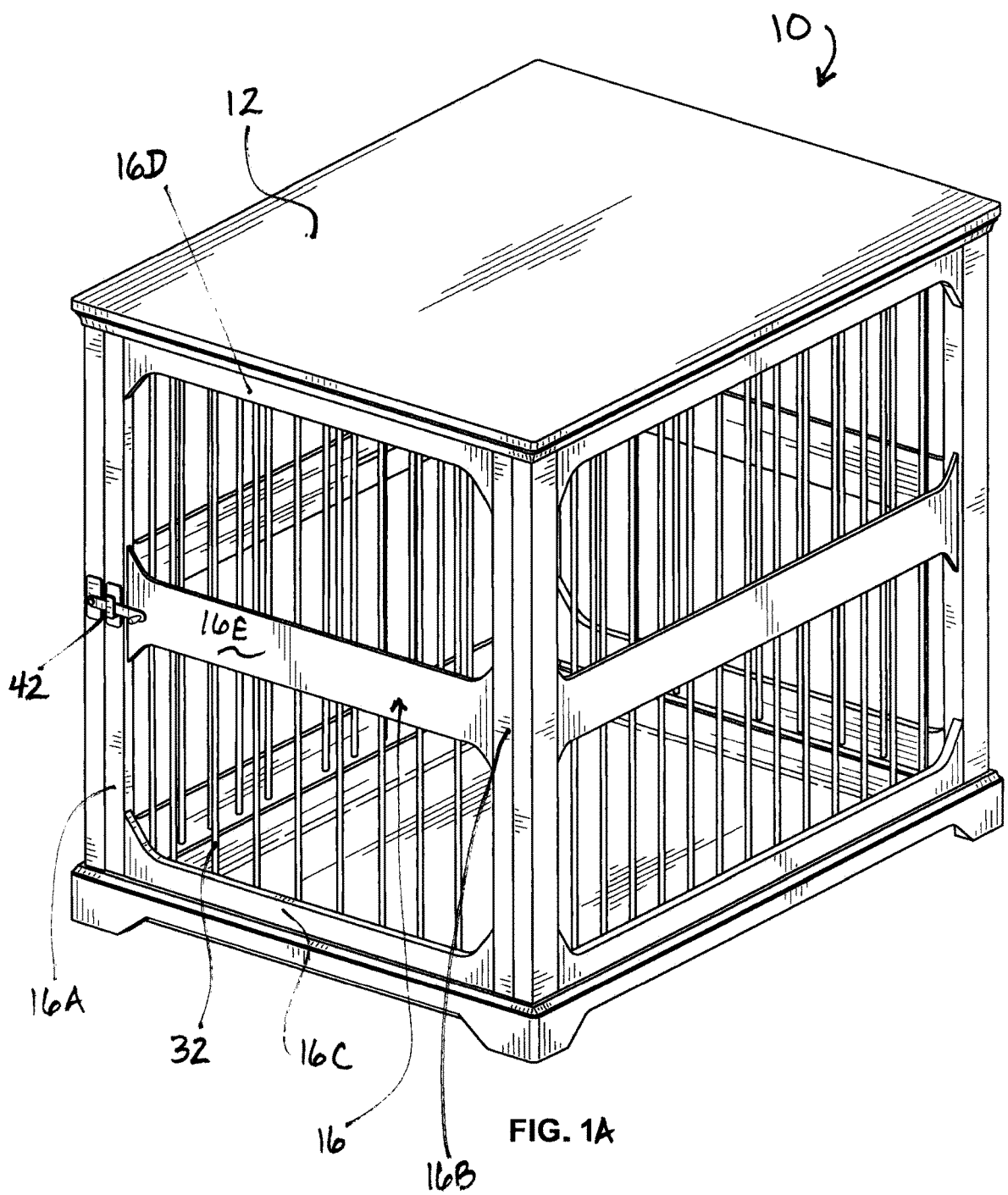
FIG. 1A is a perspective view of an end table for crating a pet in accordance with the present teachings, a door of the end table shown in a closed position.
Figure 1B:
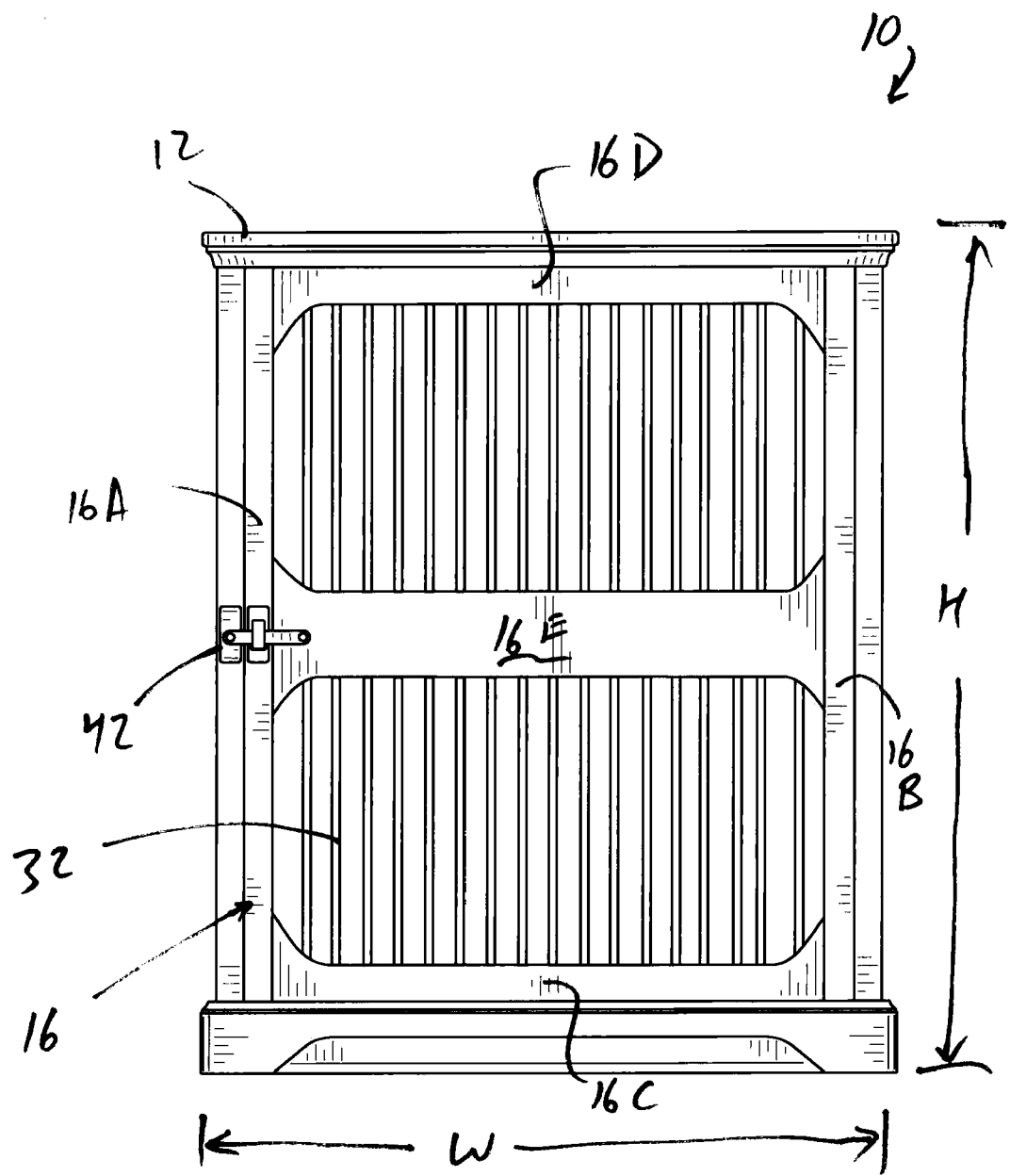
FIG. 1B is a front view of the end table for crating a pet of FIG. 1.
Figure 1C:
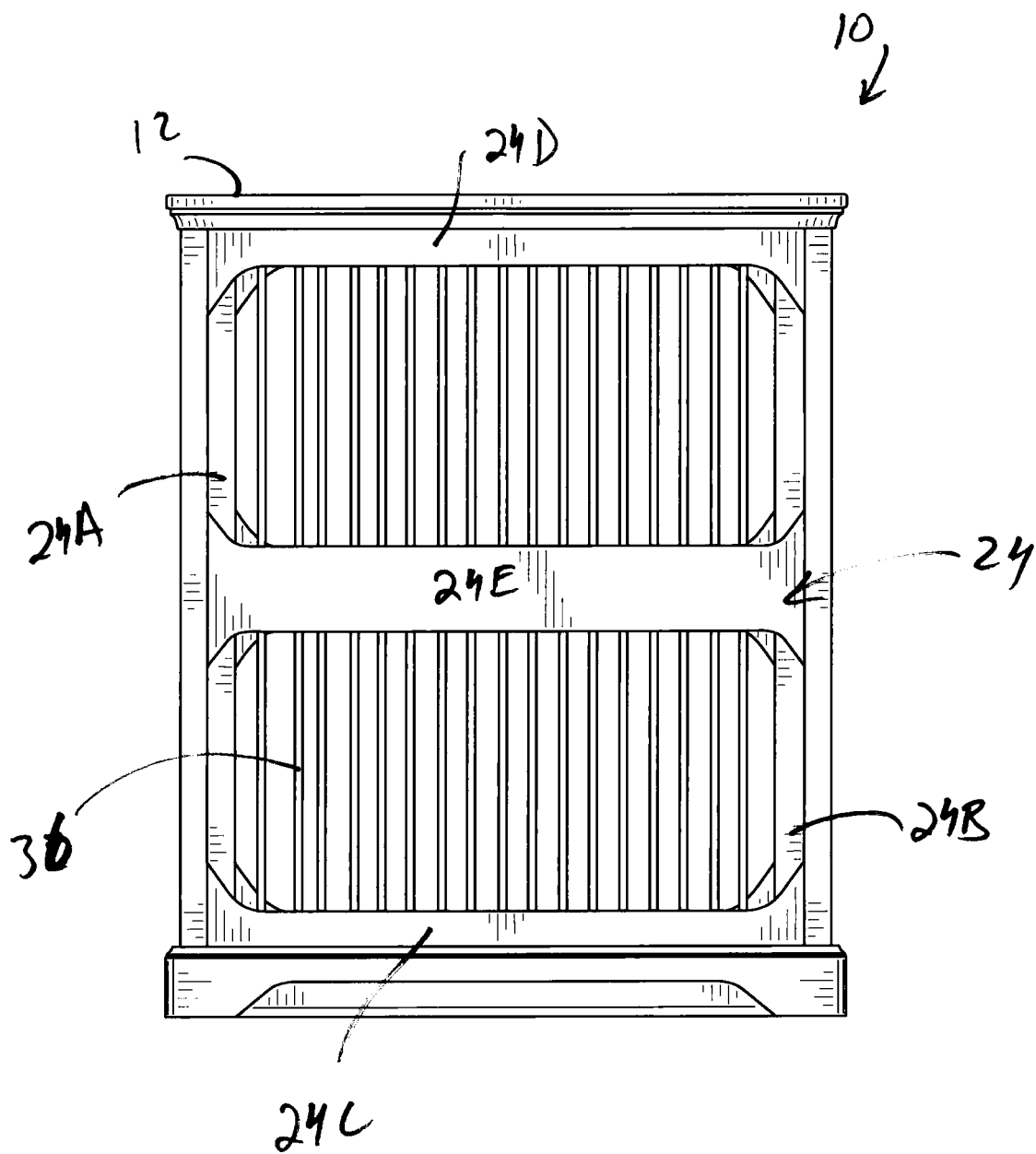
FIG. 1C is a rear view of the end table for crating a pet of FIG. 1.
Figure 1D:
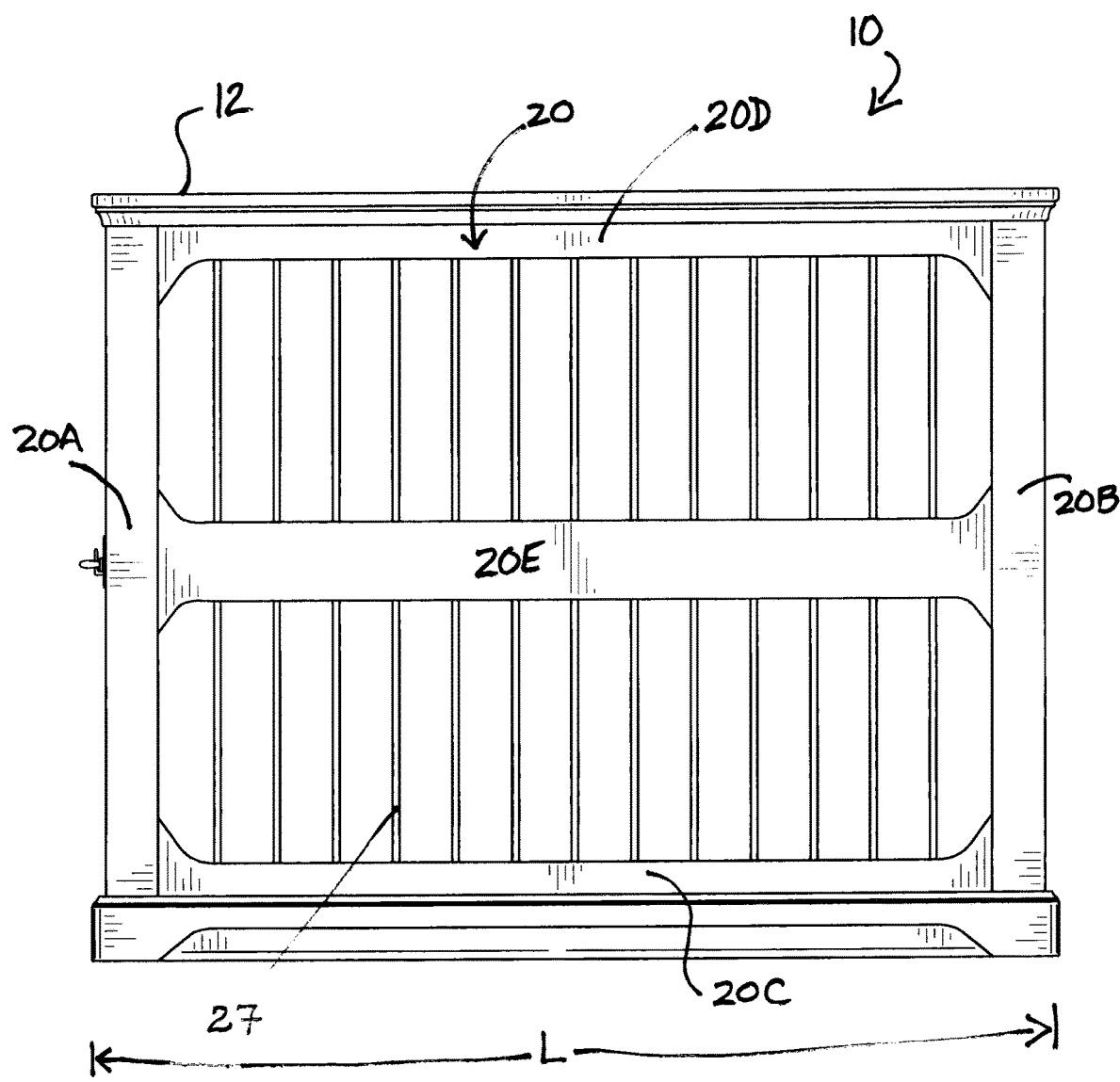
FIG. 1D is a left side view of the end table for crating a pet of FIG. 1.
Figure 1E:
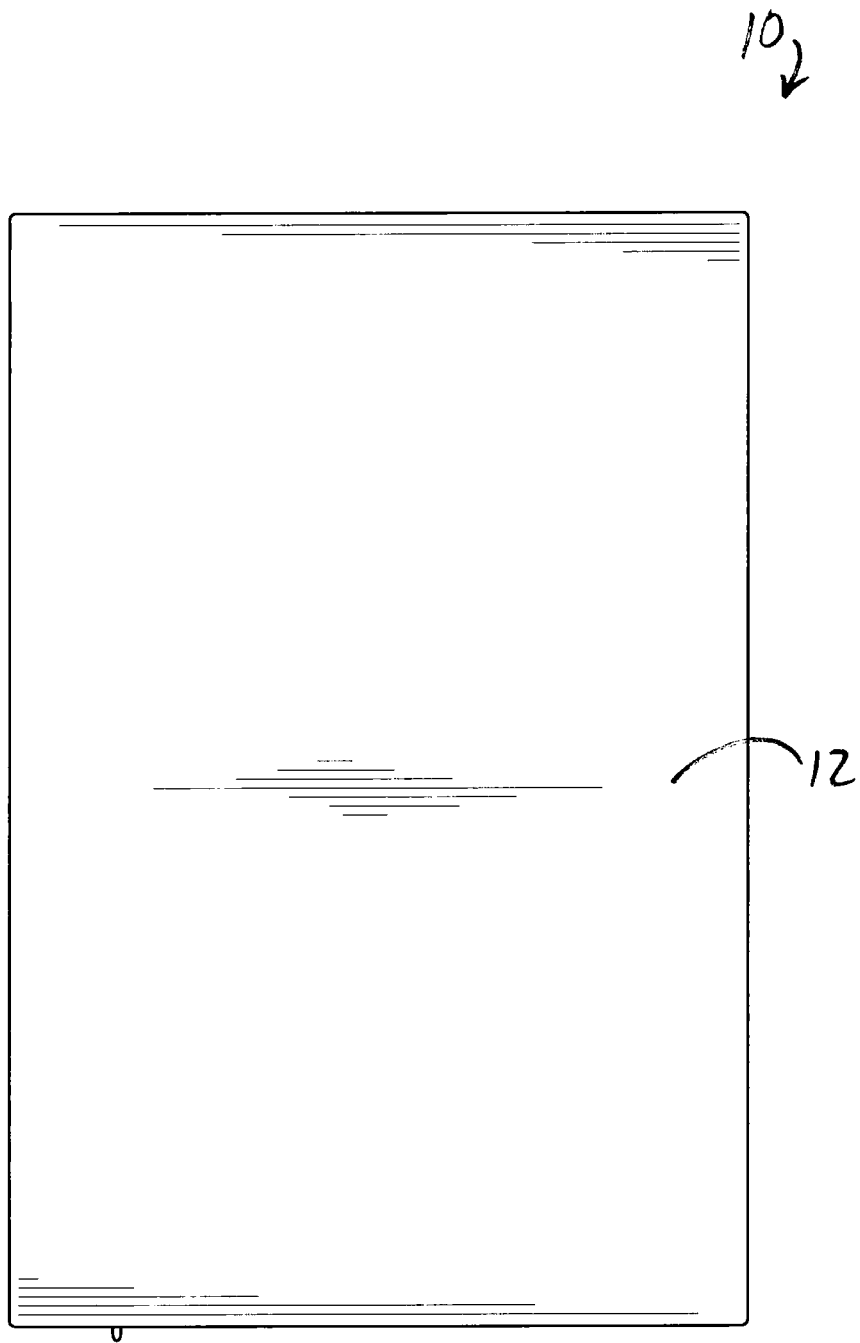
FIG. 1E is a top view of the end table for crating a pet of FIG. 1.
Figure 2:
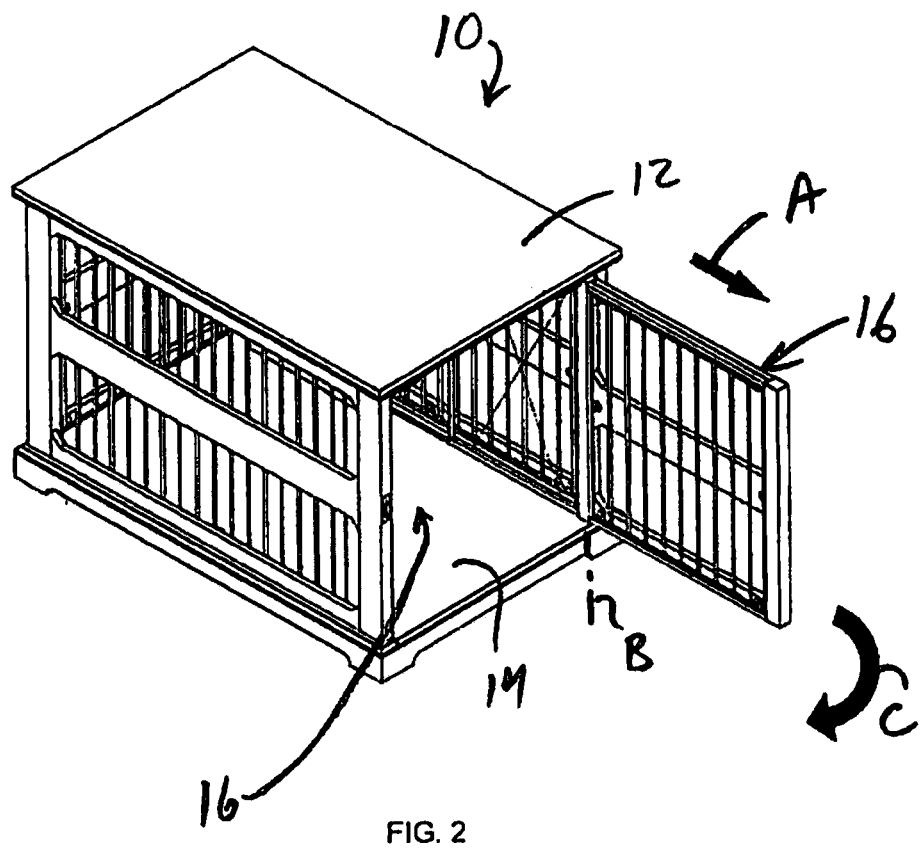
FIG. 2 is another perspective view the end table for crating a pet in accordance with the present teachings, the door of the end table shown in an open position.
Figure 3:
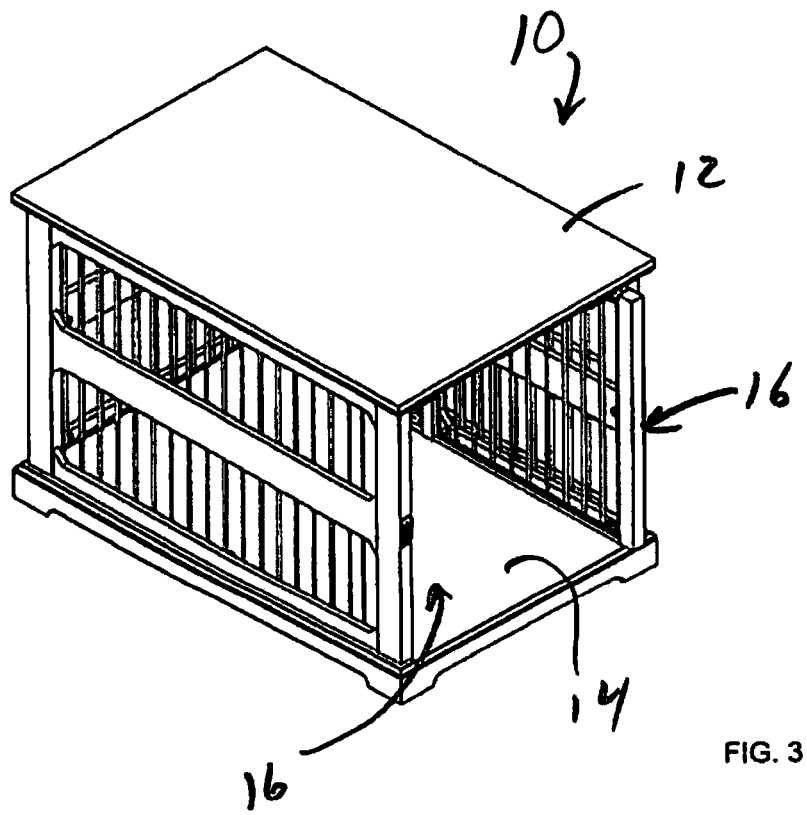
FIG. 3 is another perspective view the end table for crating a pet in accordance with the present teachings, the door of the end table shown in a stowed position.
Figure 4:
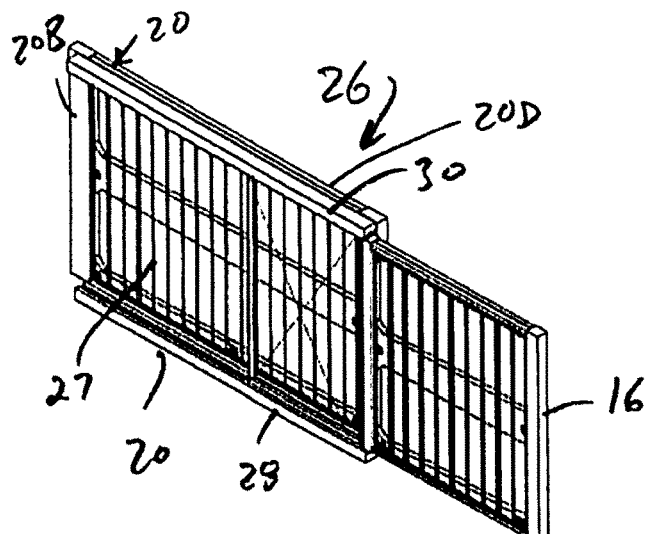
FIG. 4 is a perspective view of a side panel and door subassembly of the end table for crating a pet in accordance with the present teachings, the door shown in an open relative to the side panel.

The door 16 is carried by the first side panel 20 for sliding movement between a stowed position and an open position and for rotational movement between the open position and a closed position. The stowed position of the door 16 is shown in FIG. 3, for example. The open position of the door is shown in FIG. 2, for example. The closed position of the door 16 is shown in FIG. 1, for example. From the stowed position, the door translates in the direction of arrow A to the open position. In the open position, the door 16 may articulate about a pivot axis B, as shown by arrow C. The pivot axis B is located at a forward corner of the end table 10. In the closed position, the door 16 closes an opening that laterally extends between front ends of the first and second side panels 20 and 22 and vertically extends between the top and bottom panels 12 and 14.

In one particular embodiment, the pivot axis about which the door 16 rotates from the open position to the closed position may be defined by first and second pins extending upwardly and downwardly from the second vertically extending member 16B of the door 16. The pins may engage translatable members that are slidably received in the tracks 28 and 30 of the first side panel 20.

Figure 5:
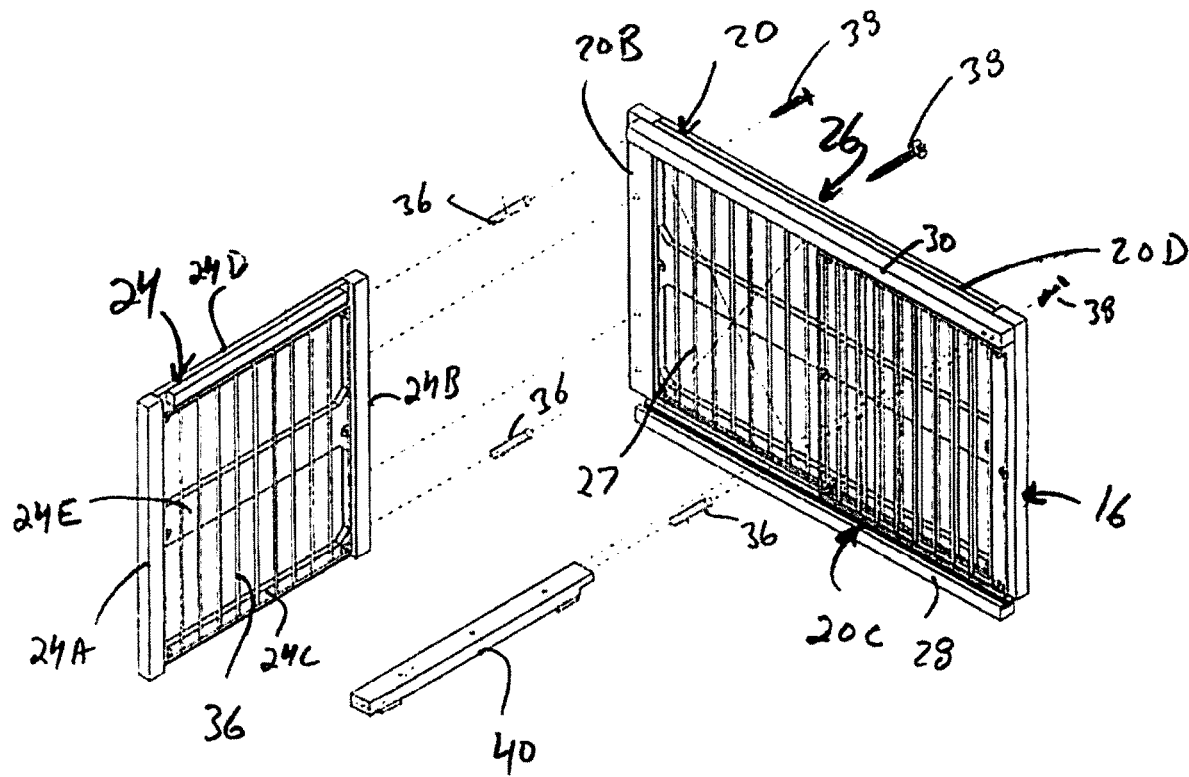
FIG. 5 is an exploded perspective view of the end table for crating a pet in accordance with the present teachings shown during assembly.

In one particular application, the end table for crating a pet 10 of the present teachings has a height H of approximately 23.5 inches, a width W of approximately 21.65 inches and a length L of approximately 35.4 inches. It will be understood that these dimensions are exemplary and may be modified within the scope of the present teachings. Assembly of the end table 10 of the present teachings will be described with reference to the exploded perspective views of FIGS. 5-8. With particular reference to FIG. 5, the rear panel 24 may be attached to the first side panel 20 with a plurality of dowels 36 and a plurality of screws 38. A first end of a laterally extending member or door stopper 40 may be secured to the first side panel 20 with a dowel 36 and a screw 38.

Figure 6:
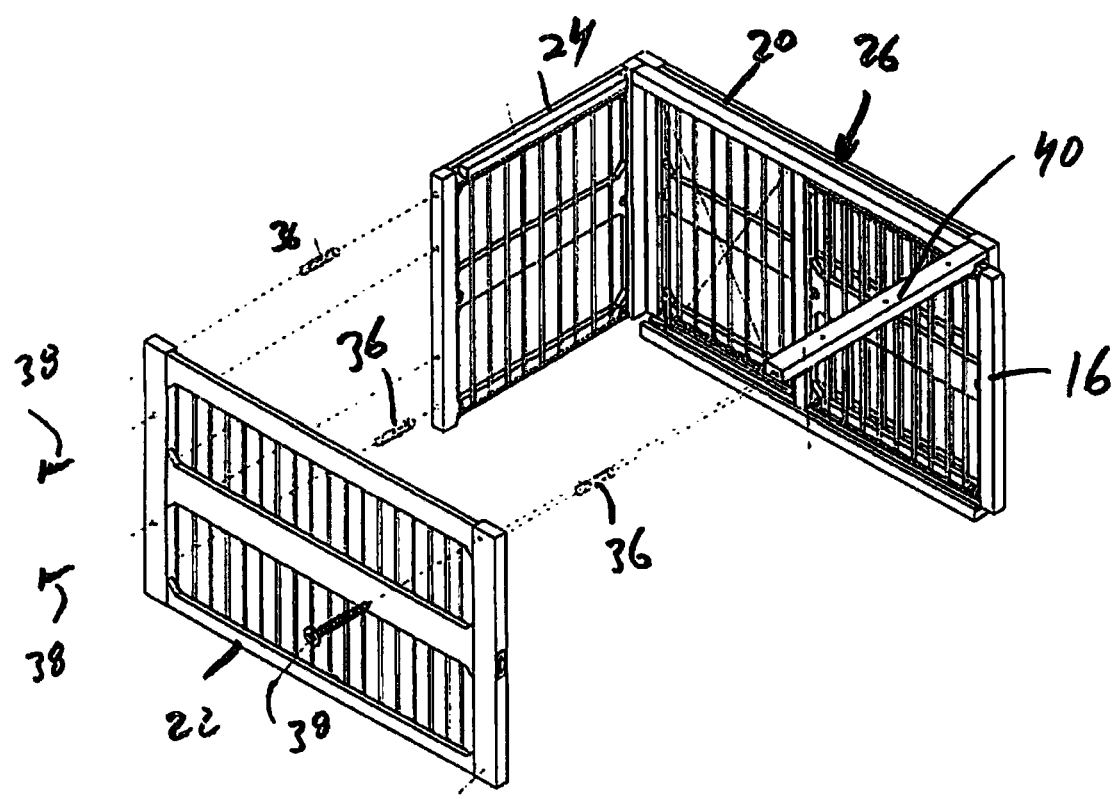
FIG. 6 is another exploded perspective view of the end table for crating a pet in accordance with the present teachings shown during assembly.

With particular reference to FIG. 6, the second side panel 22 may be attached to the rear panel 24 with a plurality of dowels 36 and a plurality of screws 38. A second end of the laterally extending member or door stopper 40 may be secured to the second side panel 22 with a dowel 36 and a screw 38.

Figure 7:
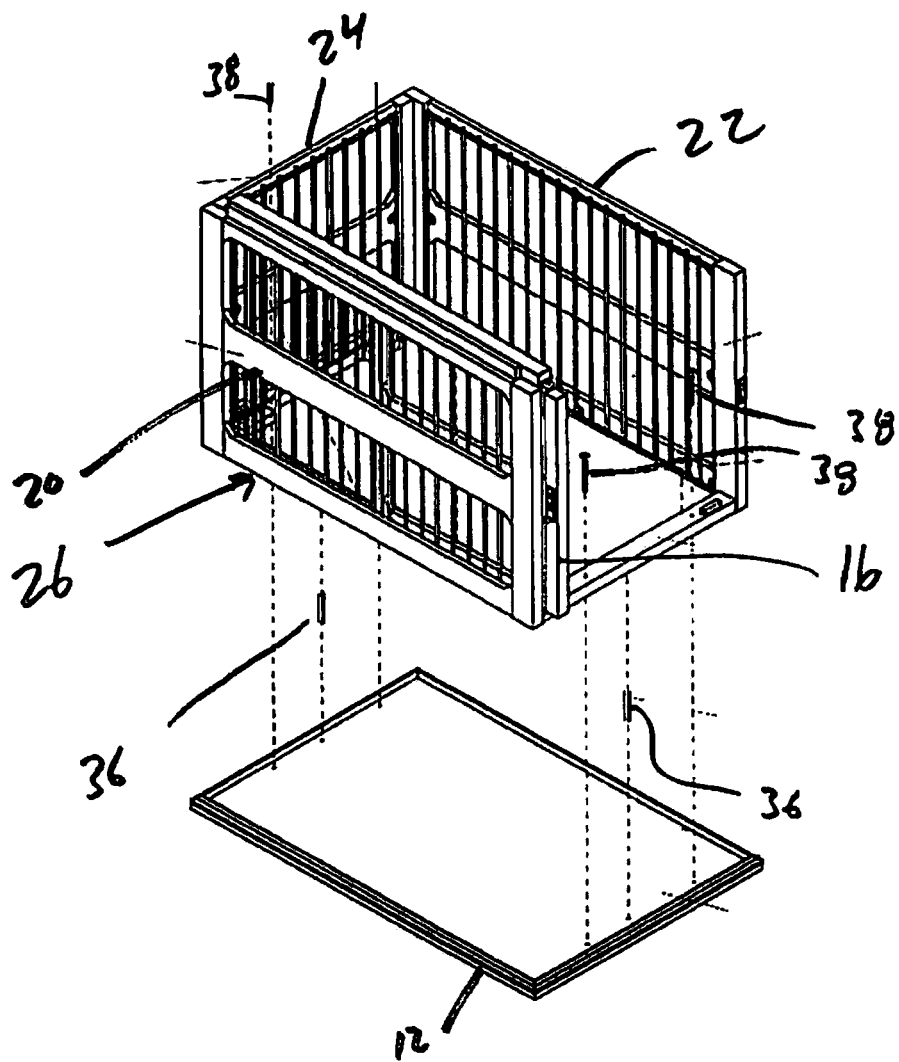
FIG. 7 is another exploded perspective view of the end table for crating a pet in accordance with the present teachings shown during assembly.
Figure 8:
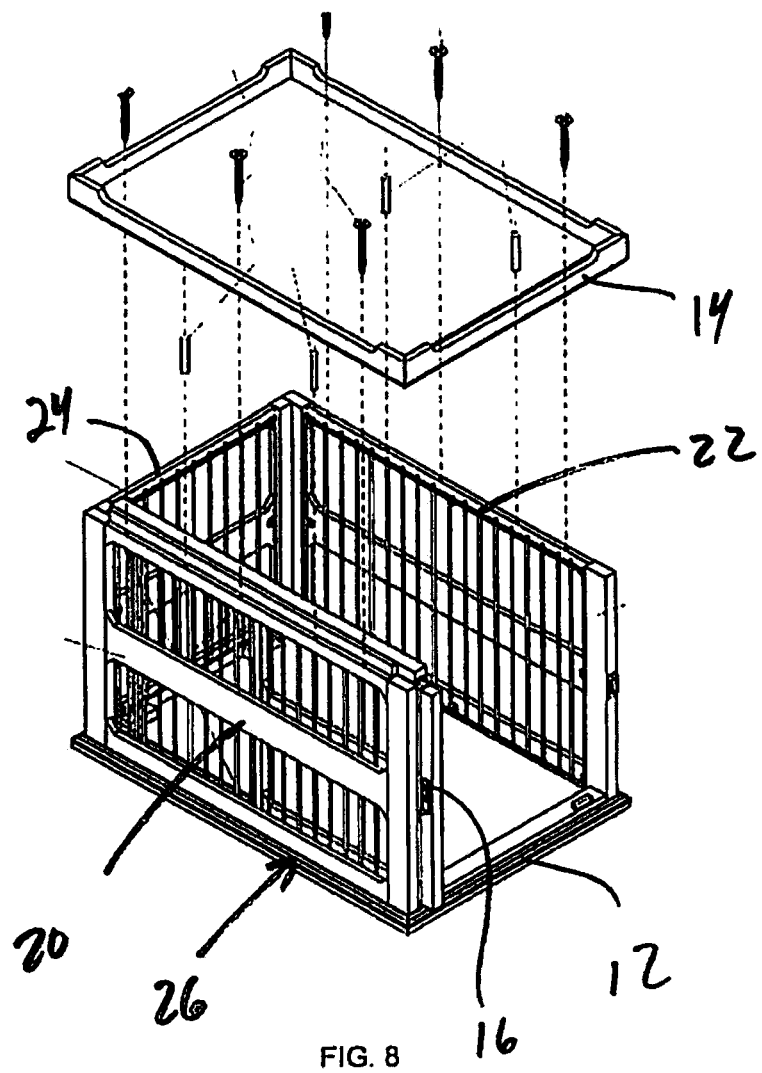
FIG. 8 is another exploded perspective view of the end table for crating a pet in accordance with the present teachings shown during assembly.

With particular reference to FIGS. 7 and 8, attachment of the top panel 12 and the bottom panel 14 is illustrated. The subassembly of FIG. 6 may be turned upside down and the top panel 12 may be secured to this subassembly with a plurality of dowels 36 and a plurality of screws 38. Similarly, the bottom panel 14 may be secured to this subassembly with a plurality of dowels 36 and a plurality of screws 38.

A latching mechanism 42 may secure the door 16 in the closed position.

The present teachings provide a structure for crating a pet that also serves as an end table. Importantly, the door 16 may be articulated from a closed position, to an open position, and then to a stowed position. In both the closed position and the stowed position, the door 16 remains within the foot print of the end table 10. Explaining further, the door 16 does not extend beyond the end table 10 into the room in either the closed position or the stowed position.

Turning to FIGS. 9A-9F, another side panel and door subassembly constructed in accordance with the teachings of the present invention is shown and identified at reference character 50. The side panel and door subassembly 50 maybe be substituted in the end table 10 for the side panel and door subassembly 26. To the extent not otherwise shown and/or described, it will be understood that the side panel and door subassembly 50 is identical in construction and function to the side panel and door subassembly 26 and may be attached to the remainder of the end table 10 in the manner discussed above. Like reference characters have been used to identify some of the similar elements common between the subassemblies 26 and 50.

The side panel and door subassembly 50 generally includes a door 16, a first side panel 20 and an intermediate frame member 52. The door 16 is rotationally attached to the intermediate frame member 52 for rotation of the door between the open position and the closed position. The intermediate frame member 52 is slidably coupled to the first side panel 20 for translation between the stowed position and the open position. The stowed position is shown in FIGS. 9A and 9B. The open position is shown in FIGS. 9C and 9D. The closed position is shown in FIGS. 9E and 9F.

In the embodiment illustrated, the intermediate frame member 52 is shown to include a first or upper horizontal portion 52A, a second or lower horizontal portion 52B and at least one vertical portion 52C. The first and second horizontal portions 52A and 52C are parallel to one another and both perpendicular to the vertical portion 52C. The vertical portion 52C is disposed at a forward end of the intermediate frame member 52.

The intermediate frame member 52 is coupled to the first side panel 20 through a first or upper slide mechanism 54 and a second or lower slide mechanism 56. The first slide mechanism 54 includes a first member 54A attached to the first side panel 20 and a second member 54B attached to the intermediate frame member 52. The second member 54B slides relative to the first member 54A. An intermediate member may be between the first and second members 54A and 54B. Ball bearings may provide smooth sliding movement between the members. The first member 54A may be secured to the first side panel 20 at a recessed portion located on the inner side of the first horizontal member 20D. The second member 54B may be secured to an outer facing side of the first horizontal member 52A of the intermediate frame member. The second slide mechanism 56 correspondingly includes first and second members similarly attached proximate the lower end of the first side panel 20 and the intermediate frame member 52.

The first and second horizontal members 52A and 52B of the intermediate frame member 52 may be connected by a brace 58. The brace 58 may be X-shaped. The brace 58 may ensure smooth operation of the independently operating first and second slide mechanism 54 and 56 by linking the top and bottom of the intermediate frame member 52 so as to allow functioning as a single unit.

The door 16 is coupled to the intermediate frame member 52 through a pair of hinges 60. The hinges 60 define an axis 62 about which the door 16 pivots from the open position to the closed position. When the door 16 is in the stowed position, the door 16 is disposed in a plane parallel to but inwardly spaced from a plane of the intermediate frame member 52. In the stowed position, door stopper 40 prevents the door 16 from articulating to a closed position. Door stopper 40 also prevents the door from closing into the interior of the end table 10 itself when the door 16 is in the closed position. Rotation of the door 16 into the end table 16 may also be limited by the hinges 60.

While specific examples have been described in the specification and illustrated in the drawings, it will be understood by those skilled in the art that various changes may be made and equivalence may be substituted for elements thereof without departing from the scope of the present teachings as defined in the claims. Furthermore, many modifications may be made to adapt a particular situation or material to the present teachings without departing from the essential scope thereof. Therefore, it may be intended that the present teachings not be limited to the particular example illustrated by the drawings and described in the specification as the best mode of presently contemplated for carrying out the present teachings.

What is claimed is:

1. An end table for crating a pet, the end table comprising:
    a first side panel;
    a second side panel laterally spaced from and parallel to the first side panel;
    a rear panel laterally extending between the first and second side panels;
    a bottom panel;
    a top panel;
    a door carried by the first side panel for sliding movement between a stowed position and an open position and for rotational movement between the open position and a closed position in which the door closes an opening laterally between front ends of the first and second side panels; and
    an intermediate frame member, the door coupled to the first side panel through the intermediate frame member;
    wherein the first side panel, the second side panel, the rear panel, the bottom panel, the top panel and the door cooperate to define an enclosed area for the pet, and
    wherein the intermediate frame member has a C-shape defined by an upper horizontal portion, a lower horizontal portion and a vertical portion extending between the upper and lower horizontal portions.

2. The end table for crating a pet of claim 1, wherein the first side panel further includes a first track and a second track, the first track attached to an inner side of the first side panel adjacent a lower edge of the first side panel, the second track attached to the inner side of the first side panel adjacent an upper edge of the first side panel.

3. The end table for crating a pet of claim 2, wherein the door translates along the first and second tracks between the open position and the stowed position.

4. The end table for crating a pet of claim 1, wherein the door rotates about a pivot axis between the open position and the closed position, the pivot axis located at a corner of the end table.

5. The end table for crating a pet of claim 1, wherein the intermediate frame member includes a first horizontal portion, a second horizontal portion and a first vertical portion extending between the first and second horizontal portions.

6. The end table for crating a pet of claim 5, further comprising first and second slide mechanisms, each slide mechanism including a first element secured to the first side panel and a second element secured to the intermediate frame member.

7. The end table for crating a pet of claim 6, wherein the intermediate frame member is parallel to the first side panel, and further wherein the door is parallel to and laterally spaced from the intermediate frame member when the door is in the stowed position.

8. The end table for crating a pet of claim 5, further comprising a brace coupled to the first and second horizontal portions of the intermediate frame member.

9. The end table for crating a pet of claim 1, wherein the first panel includes first and second horizontally extending members along a length of the end table and a wire frame including a plurality of vertically extending bars extending between the first and second horizontally extending members.

10. The end table for crating a pet of claim 9, wherein the C-shape of the intermediate frame member is open between the upper horizontal portion and the lower horizontal portion.

11. The end table for crating a pet of claim 1, wherein the door and the intermediate frame member have a collective length equal to a length of the first side panel when the door is in the stowed position.

* * * * *